(12) United States Patent
Fukami et al.

(10) Patent No.: US 11,487,882 B2
(45) Date of Patent: Nov. 1, 2022

(54) VULNERABILITY INFLUENCE EVALUATION SYSTEM

(71) Applicant: Mitsubishi Electric Corporation, Tokyo (JP)

(72) Inventors: Kenta Fukami, Tokyo (JP); Mitsunobu Yoshinaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 16/722,383

(22) Filed: Dec. 20, 2019

(65) Prior Publication Data

US 2020/0226266 A1 Jul. 16, 2020

(30) Foreign Application Priority Data

Jan. 15, 2019 (JP) .............................. JP2019-004023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 8,312,549 B2 * | 11/2012 | Goldberg | G06Q 40/08 |
| | | | 726/25 |
| 2004/0210421 A1 * | 10/2004 | Kataoka | G06F 11/008 |
| | | | 702/186 |
| 2006/0218640 A1 * | 9/2006 | Lotem | H04L 63/1433 |
| | | | 726/25 |
| 2010/0162401 A1 * | 6/2010 | Sakaki | G06Q 10/10 |
| | | | 726/25 |

(Continued)

FOREIGN PATENT DOCUMENTS

| JP | 2010086311 A | 4/2010 |
| JP | 2015041167 A | 3/2015 |

*Primary Examiner* — Fatoumata Traore
(74) *Attorney, Agent, or Firm* — Buchanan Ingersoll & Rooney PC

(57) ABSTRACT

The vulnerability influence evaluation system includes: a vulnerability information storage unit which stores vulnerability information; a vulnerability information collecting unit which collects the latest vulnerability information from the vulnerability information storage unit; a system relevance determination unit which compares system definition information about an evaluation target system with the vulnerability information, and determines whether or not there is relevance between the evaluation target system and vulnerability; a vulnerability influence degree calculation unit which calculates the vulnerability influence degree of vulnerability relevant to the evaluation target system on the basis of vulnerability influence degree calculation information; a vulnerability influence degree determination unit which performs determination as to the vulnerability level of (Continued)

the evaluation target system on the basis of the vulnerability influence degree; and an evaluation result output unit which outputs a result of determination by the vulnerability influence degree determination unit.

16 Claims, 12 Drawing Sheets

(56) References Cited

U.S. PATENT DOCUMENTS

| | | | | |
|---|---|---|---|---|
| 2012/0180133 A1* | 7/2012 | Al-Harbi | ............. | H04L 63/1433 |
| | | | | 726/25 |
| 2012/0210434 A1* | 8/2012 | Curtis | ................. | H04L 63/1441 |
| | | | | 726/25 |
| 2013/0191919 A1* | 7/2013 | Basavapatna | ........... | H04L 63/20 |
| | | | | 726/25 |
| 2014/0215629 A1* | 7/2014 | Raz | ...................... | G06F 21/577 |
| | | | | 726/25 |
| 2014/0344936 A1* | 11/2014 | Thario | ................ | G06F 3/04817 |
| | | | | 726/25 |
| 2019/0052663 A1* | 2/2019 | Lee | ......................... | H04L 63/20 |

* cited by examiner

FIG. 3A

```
                                           810A
  ┌─────────────────────────────┐
  │ VULNERABILITY ID            │
811│   ID-2017-0091              │
  ├─────────────────────────────┤
  │ PRODUCT TO BE INFLUENCED    │
812│   XXX SOFTWARE              │
  ├─────────────────────────────┤
  │ VERSION TO BE INFLUENCED    │
813│   VERSION PRIOR TO 2.3      │
  ├─────────────────────────────┤
  │ ASSUMED INFLUENCE           │
814│   POSSIBILITY OF EXECUTION  │
  │   OF OPTIONAL CODE          │
  ├─────────────────────────────┤
  │ SEVERITY                    │
815│   5.4                       │
  └─────────────────────────────┘
```

FIG. 3B

```
                                           810B
  ┌─────────────────────────────┐
  │ VULNERABILITY ID            │
811│   ID-2017-0092              │
  ├─────────────────────────────┤
  │ PRODUCT TO BE INFLUENCED    │
812│   WWW OPERATING SYSTEM      │
  ├─────────────────────────────┤
  │ VERSION TO BE INFLUENCED    │
813│   VERSION PRIOR TO 10.1     │
  ├─────────────────────────────┤
  │ ASSUMED INFLUENCE           │
814│   POSSIBILITY OF LOGIN BY   │
  │   THIRD PERSON              │
  ├─────────────────────────────┤
  │ SEVERITY                    │
815│   8.6                       │
  └─────────────────────────────┘
```

| ASSET IMPORTANCE | SUMMARY |
|---|---|
| 3 | IN CASE ASSET IS DAMAGED, STOP OF SYSTEM FOR LONG PERIOD, LARGE AMOUNT OF LOSS, OR LARGE-SCALE HUMAN DAMAGE CAN OCCUR. |
| 2 | IN CASE ASSET IS DAMAGED, STOP OF SYSTEM FOR CERTAIN PERIOD, CERTAIN AMOUNT OF LOSS, OR MIDDLE-SCALE HUMAN DAMAGE CAN OCCUR. |
| 1 | IN CASE ASSET IS DAMAGED, STOP OF SYSTEM FOR SHORT PERIOD, SMALL AMOUNT OF LOSS, OR SMALL-SCALE HUMAN DAMAGE CAN OCCUR. |

| THREAT LEVEL | SUMMARY |
|---|---|
| 3 | PROBABILITY OF OCCURRENCE OF THREAT IS HIGH. |
| 2 | PROBABILITY OF OCCURRENCE OF THREAT IS MIDDLE. |
| 1 | PROBABILITY OF OCCURRENCE OF THREAT IS LOW. |

| VULNERABILITY LEVEL | SUMMARY |
|---|---|
| 3 | IN CASE THREAT OCCURS, PROBABILITY OF READILY RECEIVING THREAT IS HIGH. OR NO COUNTERMEASURE FOR THREAT HAS BEEN TAKEN. |
| 2 | IN CASE THREAT OCCURS, PROBABILITY OF READILY RECEIVING THREAT IS MIDDLE. OR COUNTERMEASURE FOR THREAT HAS BEEN TAKEN BUT IS INSUFFICIENT. |
| 1 | IN CASE THREAT OCCURS, PROBABILITY OF RECEIVING THREAT IS LOW. OR COUNTERMEASURE FOR THREAT HAS BEEN TAKEN SUFFICIENTLY. |

FIG. 10

| ASSUMED INFLUENCE | THREAT NAME | RELEVANCE DEGREE |
|---|---|---|
| POSSIBILITY OF EXECUTION OF OPTIONAL CODE | UNAUTHORIZED EXECUTION OF PROCESS | 1.0 |
| | MALWARE INFECTION | 0.8 |
| POSSIBILITY OF INFORMATION LEAK | INFORMATION THEFT | 1.0 |
| POSSIBILITY OF DENIAL-OF-SERVICE (DoS) ATTACK | HIGH-LOAD ATTACK | 1.0 |
| POSSIBILITY OF LOGIN BY THIRD PERSON | UNAUTHORIZED ACCESS | 1.0 |
| | UNAUTHORIZED OPERATION | 1.0 |
| POSSIBILITY OF DATA DESTRUCTION | UNAUTHORIZED EXECUTION OF PROCESS | 1.0 |
| | UNAUTHORIZED DATA INPUT | 0.5 |
| ⁝ | ⁝ | ⁝ |

FIG. 11

| VULNERABILITY INFLUENCE DEGREE | RELATION WITH VULNERABILITY LEVEL |
|---|---|
| 9 < VULNERABILITY INFLUENCE DEGREE | INCREASE VULNERABILITY LEVEL BY 2 |
| 4 < VULNERABILITY INFLUENCE DEGREE ≤ 9 | INCREASE VULNERABILITY LEVEL BY 1 |
| VULNERABILITY INFLUENCE DEGREE ≤ 4 | NO CHANGE IN VULNERABILITY LEVEL |

FIG. 13

| VULNERABILITY ID | ASSUMED INFLUENCE | THREAT NAME | VULNERABILITY INFLUENCE DEGREE |
|---|---|---|---|
| ID-2017-0091 | POSSIBILITY OF EXECUTION OF OPTIONAL CODE | UNAUTHORIZED EXECUTION OF PROCESS | 5.4 |
| | | MALWARE INFECTION | 4.3 |

FIG. 14

| SYSTEM NAME | EQUIPMENT NAME | THREAT NAME | ASSET IMPORTANCE | THREAT LEVEL | VULNERABILITY LEVEL | RISK VALUE |
|---|---|---|---|---|---|---|
| SYSTEM A | OPERATION TERMINAL | UNAUTHORIZED ACCESS | 3 | 2 | 2 | B |
| | | PHYSICAL INTRUSION | | 2 | 2 | B |
| | | UNAUTHORIZED OPERATION | | 2 | 3 | A |
| | | FAULT OPERATION | | 3 | 3 | A |
| | | UNAUTHORIZED MEDIUM/DEVICE CONNECTION | | 3 | 3 | A |
| | | UNAUTHORIZED EXECUTION OF PROGRAM | | 3 | 2 | A |
| | | MALWARE INFECTION | | 3 | 2 | A |
| | | INFORMATION THEFT | | 1 | 3 | B |
| | | HIGH-LOAD ATTACK | | 1 | 3 | B |
| | | ⋮ | ⋮ | ⋮ | ⋮ | ⋮ |
| | MONITORING TERMINAL | ⋮ | ⋮ | ⋮ | ⋮ | ⋮ |
| | | ⋮ | ⋮ | ⋮ | ⋮ | ⋮ |

| VULNERABILITY ID | SYSTEM A | SYSTEM B |
|---|---|---|
| ID2017-0091 | RISK EXISTS<br><br>TARGET EQUIPMENT:<br>OPERATION TERMINAL<br>·UNAUTHORIZED EXECUTION OF<br>  PROGRAM (B->A)<br>·MALWARE INFECTION (B->A) | NO RISK |
| ID2017-0092 | NO RISK | NO RISK |

FIG. 18

```
                                            830
       ┌─────────────────────────────┐
       │ VULNERABILITY ID            │
811 ── │      ID-2017-0091           │
       ├─────────────────────────────┤
       │ PRODUCT TO BE INFLUENCED    │
812 ── │      XXX SOFTWARE           │
       ├─────────────────────────────┤
       │ VERSION TO BE INFLUENCED    │
813 ── │      VERSION PRIOR TO 2.3   │
       ├─────────────────────────────┤
       │ ASSUMED INFLUENCE           │
814 ── │   POSSIBILITY OF EXECUTION  │
       │      OF OPTIONAL CODE       │
       ├─────────────────────────────┤
       │ SEVERITY                    │
815 ── │      5.4                    │
       ├─────────────────────────────┤
       │ COUNTERMEASURE              │
836 ── │   INSTALL LATEST VERSION    │
       └─────────────────────────────┘
```

FIG. 19

| VULNERABILITY ID | SYSTEM A | SYSTEM B |
|---|---|---|
| ID2017-0091 | RISK EXISTS (VULNERABILITY COUNTERMEASURE HAS BEEN DONE) TARGET EQUIPMENT: OPERATION TERMINAL · UNAUTHORIZED EXECUTION OF PROGRAM (B->E) · MALWARE INFECTION (B->E) | NO RISK |
| ID2017-0092 | NO RISK | NO RISK |

932

VULNERABILITY INFLUENCE EVALUATION SYSTEM

BACKGROUND OF THE INVENTION

1. Field of the Invention

The present disclosure relates to a vulnerability influence evaluation system.

2. Description of the Background Art

A computer system including a plurality of hardware products and software products is introduced in various fields such as an information system or a control system. In order to stably operate such a computer system, it is necessary to cope with various security risks, and in order to cope with each security risk, it is necessary to appropriately evaluate threat and vulnerability which constitute a security risk. In addition, for a product in which presence of vulnerability is predicted as a result of vulnerability evaluation, it is necessary to take countermeasures for the vulnerability, e.g., application of a modification patch.

Conventionally, as a device for evaluating a threat on security, a device has been proposed in which information depending on risk evaluation and information not depending thereon are stored in advance as data, and extraction of a threat and calculation of the magnitude of the threat are performed on the basis of the data (see, for example, Patent Document 1).

In addition, there is a device that calculates the deterioration level of security strength for each monitoring item for systems, collects vulnerability information relevant to a product composing the system for which the deterioration level has been acquired, and calculates a vulnerability addressing priority on the basis of the degree of influence of vulnerability and the deterioration level (see, for example, Patent Document 2).

Patent Document 1: Japanese Laid-Open Patent Publication No. 2015-41167

Patent Document 2: Japanese Laid-Open Patent Publication No. 2010-86311

However, in Patent Document 1, extraction of a threat on security and calculation of the magnitude of the threat are performed on the basis of the data stored in advance. Therefore, in the case where evaluation for vulnerability influence is performed by the same method, it is difficult to timely perform evaluation for vulnerability influence while addition and update of vulnerability information are performed at all times, and perform risk evaluation on the basis of the latest vulnerability information.

In Patent Document 2, since a vulnerability addressing priority is calculated for the system for which the deterioration level of security strength has been acquired, it is difficult to perform evaluation for vulnerability influence before the security strength is deteriorated due to vulnerability. In the situation in which deterioration in the security strength is observed, there is a possibility that some threat has already arisen, and therefore vulnerability influence evaluation is required to be performed at an earlier timing.

The present disclosure has been made to solve the above problems, and an object of the present disclosure is to obtain a vulnerability influence evaluation system capable of timely performing evaluation for vulnerability influence.

SUMMARY OF THE INVENTION

A vulnerability influence evaluation system according to one aspect of the present disclosure includes: a vulnerability information storage unit which stores vulnerability information including information indicating a vulnerability target which is a target to be influenced by vulnerability, and information indicating a vulnerability severity of the vulnerability; a vulnerability information collecting unit which collects the latest vulnerability information from the vulnerability information storage unit; a relevance determination unit which compares configuration information about an evaluation target with the vulnerability information, determines whether or not there is relevance between the evaluation target and the vulnerability on the basis of whether or not the evaluation target includes the vulnerability target, and detects the vulnerability determined to be relevant to the evaluation target, as relevant vulnerability; a vulnerability influence degree calculation unit which calculates a vulnerability influence degree of the relevant vulnerability on the basis of the vulnerability severity of the relevant vulnerability and a relevance degree between the relevant vulnerability and a threat according to the relevant vulnerability; a vulnerability influence degree determination unit which performs determination as to a vulnerability level of the evaluation target on the basis of the vulnerability influence degree; and an output unit which outputs a result of the determination by the vulnerability influence degree determination unit.

The vulnerability influence evaluation system according to one aspect of the present disclosure is capable of timely performing evaluation for vulnerability influence.

BRIEF DESCRIPTION OF THE DRAWINGS

FIG. 3A is a diagram showing an example of vulnerability information according to the first embodiment;

FIG. 3B is a diagram showing another example of vulnerability information according to the first embodiment;

FIG. 6 is a diagram showing an example of asset importance definition information according to the first embodiment;

FIG. 7 is a diagram showing an example of threat level definition information according to the first embodiment;

FIG. 8 is a diagram showing an example of vulnerability level definition information according to the first embodiment;

FIG. 10 is a diagram showing an example of vulnerability influence degree calculation information according to the first embodiment;

FIG. 11 is a diagram showing an example of vulnerability influence degree determination information according to the first embodiment;

FIG. 13 is a diagram showing a result of calculation of a vulnerability influence degree according to the first embodiment;

FIG. 14 is a diagram showing an example of risk evaluation information after update of a vulnerability level;

FIG. 18 is a diagram showing an example of vulnerability information according to the third embodiment; and FIG. 19 is a diagram showing an example of output of an evaluation result according to the third embodiment.

DETAILED DESCRIPTION OF THE PREFERRED

Embodiments of the Invention

First Embodiment

Figure 1:
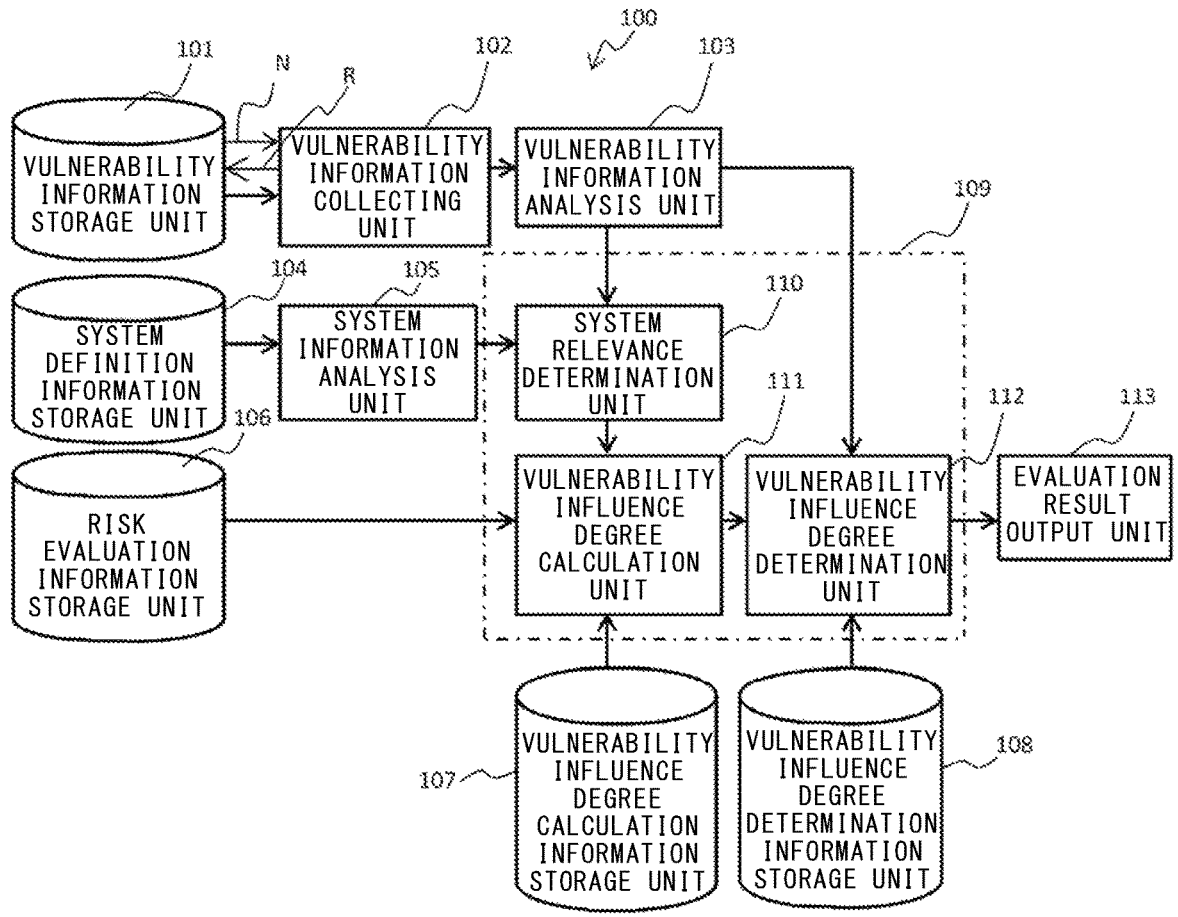
FIG. 1 is a function block diagram showing the configuration of a vulnerability influence evaluation system according to the first embodiment of the present disclosure.

Hereinafter, the first embodiment will be described with reference to FIG. 1 to FIG. 15. FIG. 1 is a function block diagram showing the configuration of a vulnerability influence evaluation system according to the first embodiment. A vulnerability influence evaluation system 100 includes: a vulnerability information storage unit 101 which stores the latest vulnerability information about security; a vulnerability information collecting unit 102 which collects vulnerability information from the vulnerability information storage unit 101; and a vulnerability influence evaluation unit 109 which evaluates, as a vulnerability influence degree, the magnitude of influence of specific vulnerability in an evaluation target system. The vulnerability influence evaluation unit 109 includes: a system relevance determination unit 110 which determines whether or not there is relevance between an evaluation target system and specific vulnerability; a vulnerability influence degree calculation unit 111 which calculates a vulnerability influence degree indicating the magnitude of influence of specific vulnerability on the evaluation target system; a vulnerability influence degree determination unit 112 which performs determination as to the vulnerability level of vulnerability that the evaluation target system has; and an evaluation result output unit 113 which outputs a result of evaluation by the vulnerability influence evaluation unit 109.

Further, the vulnerability influence evaluation system 100 includes: a vulnerability information analysis unit 103 which analyzes vulnerability information collected by the vulnerability information collecting unit 102 and transmits information needed for vulnerability evaluation to the system relevance determination unit 110 of the vulnerability influence evaluation unit 109; a system information analysis unit 105 which acquires system definition information about the evaluation target system from a system definition information storage unit 104, analyzes the acquired system definition information to extract information needed for vulnerability evaluation for the evaluation target system, and transmits the extracted information to the system relevance determination unit 110; a vulnerability influence degree calculation information storage unit 107 which stores vulnerability influence degree calculation information which is information needed for calculation of the vulnerability influence degree; and a vulnerability influence degree determination information storage unit 108 which stores vulnerability influence degree determination information which is information needed for determining the vulnerability level.

Figure 2:
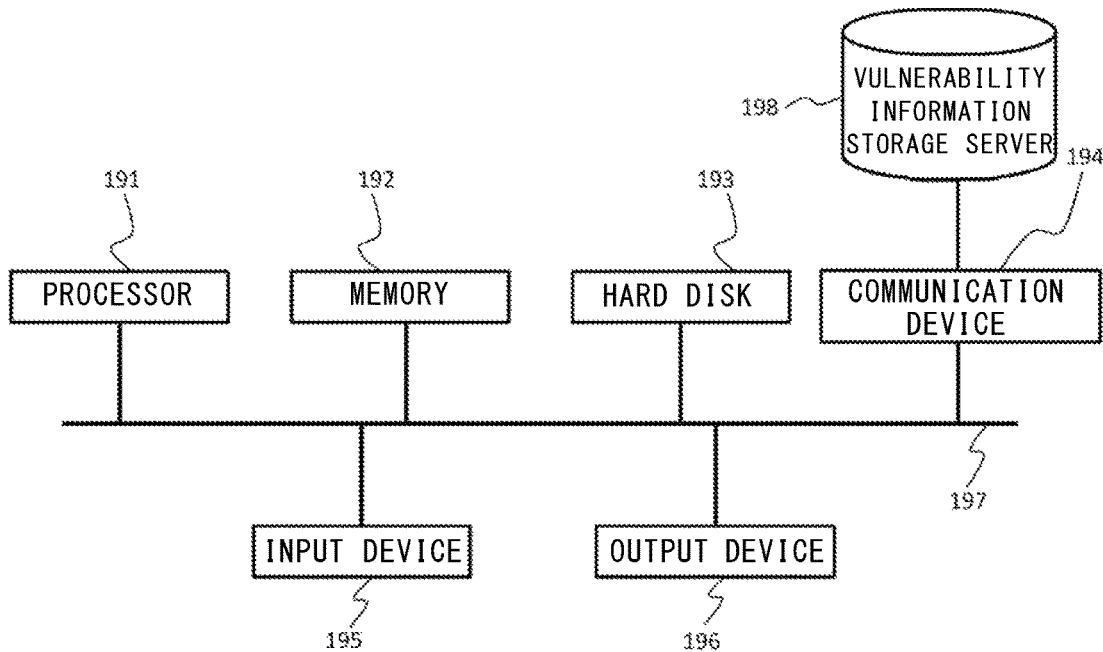
FIG. 2 is a hardware configuration diagram showing the vulnerability influence evaluation system according to the first embodiment.

FIG. 2 is a hardware configuration diagram showing a vulnerability influence evaluation system according to the first embodiment, and the above function units are formed by hardware shown in FIG. 2. As shown in FIG. 2, the vulnerability influence evaluation system 100 is configured by connecting, via a system bus 197: a processor 191 as a computing processing device; a memory 192 as a main memory device; a hard disk 193 as an auxiliary memory device; a communication device 194 which performs transmission/reception of data with an external device via a network; an input device 195 which receives an input from outside; and an output device 196 which outputs a result of evaluation for vulnerability influence, and the like, to outside.

The processor 191 is, for example, a central processing unit (CPU), executes a program stored in the memory 192 or the hard disk 193 to perform various calculations and processes, and stores the obtained results in the memory 192 or the hard disk 193. The communication device 194 collects the latest vulnerability information from a vulnerability information storage server 198 via a communication network such as the Internet. The collected vulnerability information is stored in the memory 192 or the hard disk 193. The vulnerability information storage server 198 may be a database server of a site where the latest vulnerability information is added and updated at all times, e.g., Japan vulnerability notes (JVN). In the example shown in FIG. 2, an external database server is used as means for realizing the vulnerability information storage unit 101. However, an internal memory device for storing vulnerability information in a form of mail or text may be used as means for realizing the vulnerability information storage unit 101. The input device 195 may be, for example, a keyboard, a mouse, a touch panel, etc. The output device 196 is, for example, a display device such as a liquid crystal display, or a printing device.

The hardware configuration shown in FIG. 2 is merely an example, and the hardware configuration is not limited thereto. For example, a plurality of processors 191, a plurality of memories 192, and a plurality of hard disks 193 may be provided, and the above functions may be realized by cooperation of the plurality of processors 191, the plurality of memories 192, and the plurality of hard disks 193.

The vulnerability information storage unit 101 additionally stores new vulnerability information periodically, and retains the latest vulnerability information by performing update if there is any change in the stored vulnerability information. When the vulnerability information is added or updated, the vulnerability information storage unit 101 transmits a vulnerability information update notification N to the vulnerability information collecting unit 102. It is noted that the "vulnerability information" in the first embodiment is, for example, constituted of a plurality of elements as in vulnerability information 810A, 810B shown in FIG. 3A and FIG. 3B, and is text-form data including: vulnerability identification information 811 indicating a vulnerability ID as an identifier; vulnerability relevant product information 812 indicating a product that might be influenced by vulnerability; vulnerability relevant version information 813 indicating a version to be influenced by vulnerability, with regard to the product indicated by the vulnerability relevant product information 812; vulnerability influence information 814 indicating influence assumed by vulnerability; and vulnerability severity information 815 indicating severity of vulnerability in terms of security. The vulnerability relevant product information 812 and the vulnerability relevant version information 813 are information indicating a target to be influenced by the vulnerability, i.e., a vulnerability target. It is noted that, as a method for evaluating the aforementioned severity, common vulnerability scoring system (CVSS) may be used. In addition, the data form of the vulnerability information is not particularly limited, and may be a table form or a database form.

When having received the vulnerability information update notification N, the vulnerability information collecting unit 102 transmits a vulnerability information transmission request R to the vulnerability information storage unit 101, and collects the latest vulnerability information from the vulnerability information storage unit 101. The vulnerability information collecting unit 102 transmits the collected vulnerability information to the vulnerability information analysis unit 103.

The vulnerability information analysis unit 103 analyzes the vulnerability information received from the vulnerability information collecting unit, extracts information needed for vulnerability influence evaluation, and transmits the extracted information to the vulnerability influence evaluation unit 109 and the vulnerability influence degree determination unit 112. It is noted that, as described above, the data form of the vulnerability information 810A and the vulnerability information 810B is not limited to a text form, and therefore the vulnerability information analysis unit 103 includes a plurality of vulnerability information analysis units adapted to respective data forms.

Figure 4:
FIG. 4 is a diagram showing an example of system definition information according to the first embodiment.

The system definition information storage unit 104 stores system definition information about an evaluation target system. FIG. 4 shows an example of the system definition information. System definition information 901 is table-form data including a system name, an equipment name of equipment constituting the system, constituent components indicating hardware and software constituting each equipment, and the version of each constituent component, and is configuration information including information about each element constituting the evaluation target system. It is noted that the data form of the system definition information is not particularly limited, and may be a text form, a graphic form, or a database form.

The system information analysis unit 105 acquires the system definition information from the system definition information storage unit 104 and analyzes the same, extracts each element of the system definition information, i.e., the system name, equipment names, constituent components, and versions, and transmits them to the system relevance determination unit 110. It is noted that, as described above, the data form of the system definition information 901 is not limited to a table form, and therefore, the system information analysis unit 105 includes a plurality of system definition information analysis units adapted to respective data forms.

The system relevance determination unit 110 compares the analyzed vulnerability information received from the vulnerability information analysis unit 103 and the analyzed system definition information received from the system information analysis unit 105, and determines whether or not there is relevance between the vulnerability information and the evaluation target system. The system relevance determination unit 110 defines, as a relevant vulnerability, the vulnerability determined to be relevant to the evaluation target system, and transmits this vulnerability information to the vulnerability influence degree calculation unit 111.

Figure 5:
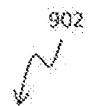
FIG. 5 is a diagram showing an example of risk evaluation information according to the first embodiment.
Figure 9:
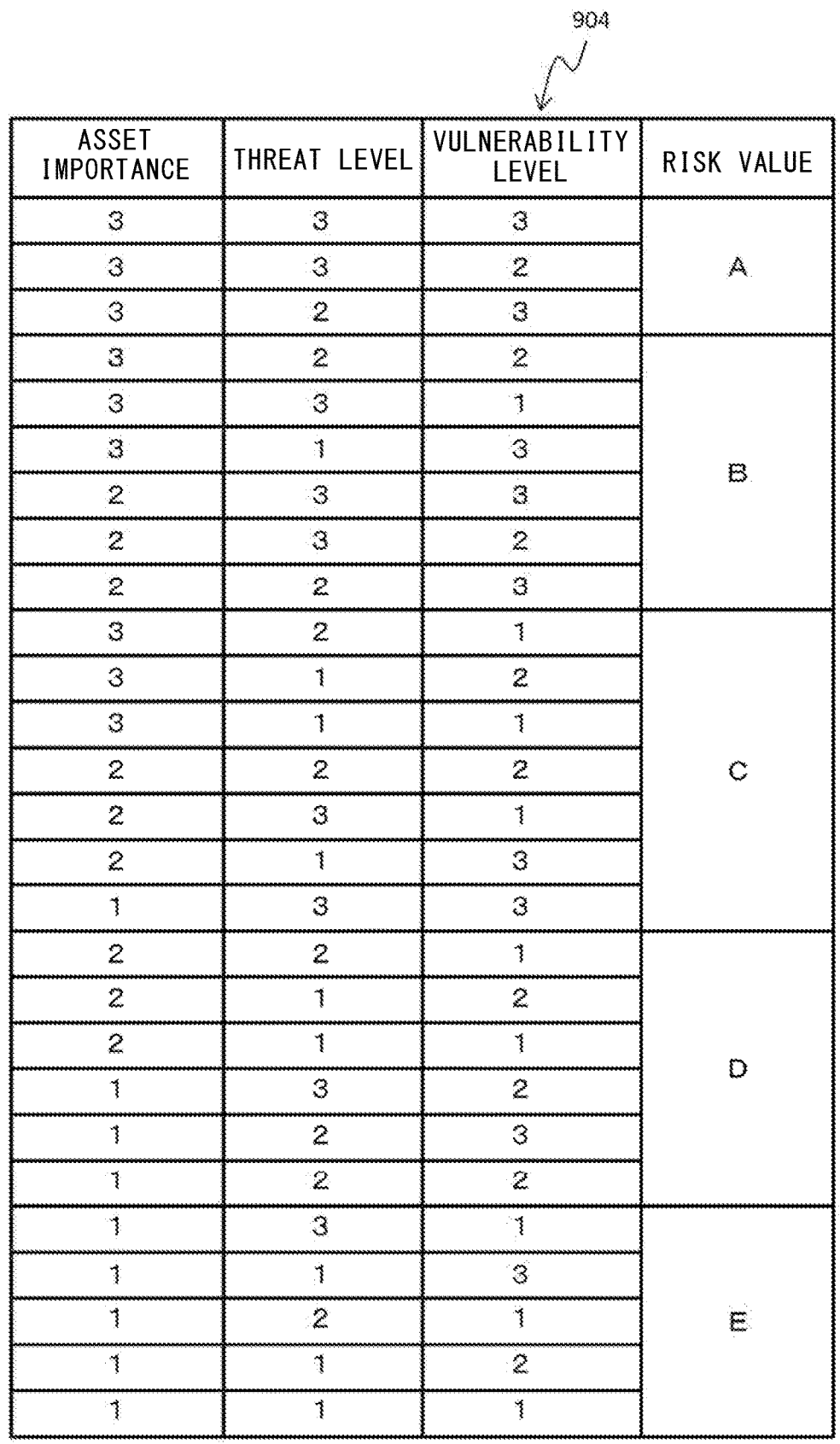
FIG. 9 is a diagram showing an example of risk value definition information according to the first embodiment.

A risk evaluation information storage unit 106 stores risk evaluation information needed for risk evaluation. FIG. 5 shows an example of the risk evaluation information. The risk evaluation information 902 is table-form data including a system name of an evaluation target system, an equipment name of each equipment constituting the evaluation target system, a name (threat name) of a threat that can damage each equipment, a degree (asset importance) of importance of each equipment in terms of asset, a degree (threat level) of occurrence probability of each threat, a degree (vulnerability level) of vulnerability that each equipment has with respect to the relevant threat, and a degree (risk value) of the magnitude of security risk due to each threat. The specific content of the risk evaluation information 902 may be information inputted by a user in advance, or may be a result of risk evaluation performed in the past. It is noted that the data form of the risk evaluation information is not particularly limited, and may be a text form or a database form.

In the first embodiment, as in examples shown in FIG. 6, FIG. 7, and FIG. 8, the asset importance, the threat level, and the vulnerability level are defined at three levels of "3", "2", "1". As shown in asset importance definition information 903A, as the asset importance of the equipment becomes higher, greater economic loss or human damage can occur when the equipment is damaged. In addition, as shown in threat level definition information 903B, as the threat level of the threat becomes higher, the probability of occurrence of the threat becomes higher. In addition, as shown in vulnerability level definition information 903C, as the vulnerability level becomes higher, the probability that the equipment receives the generated threat becomes higher. The risk value is uniquely determined by combination of the asset importance, the threat level, and the vulnerability level defined as described above. The risk value is defined at five levels from "A" to "E" in the order from the highest one, as in risk value definition information 904 shown in FIG. 9.

The vulnerability influence degree calculation information storage unit 107 stores vulnerability influence degree calculation information needed for calculating the vulnerability influence degree which is the degree of vulnerability influence. FIG. 10 shows an example of the vulnerability influence degree calculation information. The vulnerability influence degree calculation information 905 is table-form data including influence assumed due to vulnerability, a threat name of a threat according to the influence, and a "relevance degree" indicating the strength of the relevance between the vulnerability and the threat. The specific values of the "relevance degree" are preset on the basis of evaluation performed by a user in advance. It is noted that the data form of the vulnerability influence degree calculation information is not particularly limited, and may be a text form or a database form.

The vulnerability influence degree calculation unit 111 acquires the vulnerability influence degree calculation information 905 from the vulnerability influence degree calculation information storage unit 107, and calculates the vulnerability influence degree on the basis of the vulnerability influence degree calculation information 905. When calculating the vulnerability influence degree of specific vulnerability, the vulnerability influence degree calculation unit 111 acquires vulnerability information about the relevant vulnerability from the system relevance determination unit 110, and calculates the vulnerability influence degree from the severity of the relevant vulnerability and the relevance degree in the vulnerability influence degree calculation information 905. In the first embodiment, the vulnerability influence degree is defined as "product of severity and relevance degree". The vulnerability influence degree is calculated for each vulnerability and each threat. After calculation of the vulnerability influence degree, the vulnerability influence degree calculation unit 111 transmits the calculation result of the vulnerability influence degree to the vulnerability influence degree determination unit 112. In addition, the vulnerability influence degree calculation unit 111 acquires the risk evaluation information 902 about the evaluation target system from the risk evaluation information storage unit 106, and transmits the acquired risk evaluation information 902 to the vulnerability influence degree determination unit 112.

The vulnerability influence degree determination unit 112 performs determination as to the vulnerability level of the vulnerability that the evaluation target system has, on the basis of the vulnerability influence degree determination information stored in the vulnerability influence degree determination information storage unit 108. In the first embodiment, it is assumed that determination for the vulnerability level has been performed one or more times, and determination for the vulnerability level is performed by determining whether or not the vulnerability level needs to be changed, and the amount of the change. FIG. 11 shows an example of the vulnerability influence degree determination information. The vulnerability influence degree determination information 906 is information that defines relevance between the value range of the vulnerability influence degree and the content of change of the vulnerability level associated with each range. When having received the calculation result of the vulnerability influence degree from the vulnerability influence degree calculation unit 111, the vulnerability influence degree determination unit 112 determines whether or not the vulnerability level needs to be changed, and the amount of change of the vulnerability level, on the basis of the vulnerability influence degree determination information 906. In addition, the vulnerability influence degree determination unit 112 receives the risk evaluation information 902 from the vulnerability influence degree calculation unit 111, and updates the risk evaluation information 902 in accordance with a result of determination for the vulnerability level. After update of the risk evaluation information 902, the vulnerability influence degree determination unit 112 transmits the updated risk evaluation information to the evaluation result output unit 113. It is noted that the updated risk evaluation information may be transmitted to the risk evaluation information storage unit 106 and the risk evaluation information stored in the risk evaluation information storage unit 106 may be updated.

In the vulnerability influence degree determination information 906, whether or not the vulnerability level needs to be changed, and the amount of the change, are determined by only the magnitude of the vulnerability influence degree. However, the vulnerability level at present may be also taken into consideration. For example, a threshold for whether or not the vulnerability level needs to be changed may be set to differ between the case where the vulnerability level at present is "1" and the case where the vulnerability level at present is "2".

The evaluation result output unit 113 receives the risk evaluation information from the vulnerability influence degree determination unit 112 and outputs the content of the received risk evaluation information to a memory device such as the output device 196 or the hard disk 193.

Figure 12:
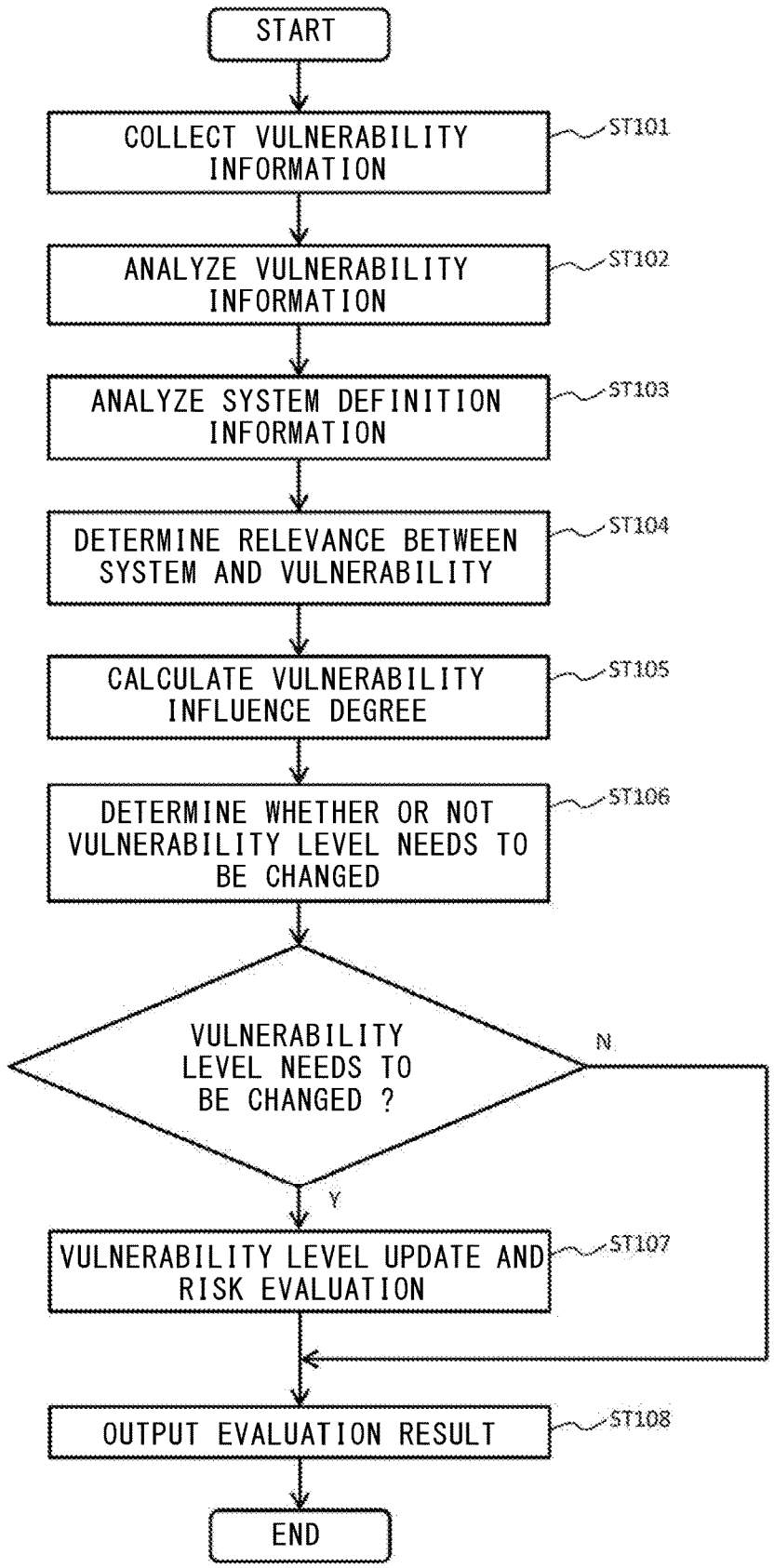
FIG. 12 is a flowchart showing operation of the vulnerability influence evaluation system according to the first embodiment.

Next, operation will be described. FIG. 12 is a flowchart showing operation of the vulnerability influence evaluation system according to the first embodiment. In the following description, the system A described in the system definition information 901 is used as an evaluation target system, and vulnerability of vulnerability ID 2017-0091 and vulnerability of vulnerability ID 2017-0092 are used as specific examples of vulnerability. First, the vulnerability information collecting unit 102 collects the latest vulnerability information from the vulnerability information storage unit 101 (step ST101), acquires the vulnerability information 810A and the vulnerability information 810B, and transmits the acquired information to the vulnerability information analysis unit 103. The vulnerability information analysis unit 103 analyzes the vulnerability information 810A, 810B received from the vulnerability information collecting unit 102, and extracts information needed for evaluation for vulnerability influence (step ST102). The vulnerability information analysis unit 103 transmits the analyzed vulnerability information 810A, 810B to the system relevance determination unit 110 and the vulnerability influence degree determination unit 112. It is noted that, as described above, the data form of the vulnerability information is not particularly limited and the vulnerability information can have various data forms. Therefore, first, the vulnerability information analysis unit 103 identifies the data form of the received vulnerability information, and then performs analysis in accordance with the identified data form.

Next, the system information analysis unit 105 acquires the system definition information 901 about the evaluation target system from the system definition information storage unit 104, analyzes the acquired system definition information 901, and extracts information about the system configuration needed for vulnerability influence evaluation (step ST103). The system information analysis unit 105 transmits the analyzed system definition information 901 to the system relevance determination unit 110. It is noted that, as described above, the data form of the system definition information is not particularly limited and the system definition information can have various data forms. Therefore, first, the system information analysis unit 105 identifies the data form of the acquired system definition information, and then performs analysis in accordance with the identified data form. In the first embodiment, analysis of the system definition information 901 by the system information analysis unit 105 is performed after analysis of the vulnerability information 810A, 810B by the vulnerability information analysis unit 103. However, the analysis order is not particularly limited. Analysis of the system definition information 901 may be performed first, or both analyses may be performed in parallel.

After analysis of the vulnerability information 810A, 810B by the vulnerability information analysis unit 103 and analysis of the system definition information 901 by the system information analysis unit 105, the vulnerability influence evaluation unit 109 performs evaluation for the vulnerability influence degree. First, using the system definition information 901 received from the system information analysis unit 105 and the vulnerability information 810A, 810B received from the vulnerability information analysis unit 103, the system relevance determination unit 110 determines whether or not there is relevance between the system A which is the evaluation target system, and the vulnerability of each vulnerability information 810A, 810B (step ST104). As described above, determination by the system relevance determination unit 110 as to whether or not there is such relevance is performed on the basis of whether or not the evaluation target system A includes the vulnerability target indicated by the vulnerability information 810A, 810B.

Relevance between the system A, and vulnerability of the vulnerability information 810A and vulnerability of the vulnerability information 810B, will be described. The vulnerability target of vulnerability of the vulnerability information 810A is XXX software of a version prior to version 2.3, and according to the system definition information 901, the system A includes an operation terminal having XXX software of version 2.2. Thus, since the system A includes the vulnerability target of vulnerability of the vulnerability information 810A, the vulnerability of the vulnerability information 810A is determined to be relevant to the system A. In addition, the vulnerability target of vulnerability of the vulnerability information 810B is a WWW operating system of a version prior to version 10.1, and according to the system definition information 901, the version of the WWW operating system of the operation terminal constituting the system A is 10.3 (it is assumed that WWW operating systems other than this is not included in the system A). Thus, since the system A does not include the vulnerability target of vulnerability of the vulnerability information 810B, the vulnerability of the vulnerability information 810B is determined to be not relevant to the system A. In this way, by determining whether or not there is relevance between the evaluation target and the vulnerability, the system relevance determination unit 110 detects vulnerability relevant to the evaluation target, as relevant vulnerability. After the determination, the system relevance determination unit 110 transmits the vulnerability information 810A which is vulnerability information about the relevant vulnerability, to the vulnerability influence degree calculation unit 111.

Next, on the basis of the vulnerability influence degree calculation information 905, the vulnerability influence degree calculation unit 111 calculates the degree of vulnerability influence on the evaluation target system (step ST105). When having received the vulnerability information 810A of the relevant vulnerability from the system relevance determination unit 110, the vulnerability influence degree calculation unit 111 extracts the "assumed influence" of the vulnerability influence information 814, and compares the extracted "assumed influence" with the "assumed influence" of the vulnerability influence degree calculation information 905. If the same "assumed influence" as that of the vulnerability influence information 814 is detected, the vulnerability influence degree calculation unit 111 extracts the threat and the relevance degree corresponding to the "assumed influence", and calculates a product of the value of severity of the vulnerability severity information 815 and the value of relevance degree, thereby calculating the value of the vulnerability influence degree.

The vulnerability influence degree regarding the vulnerability information 810A will be specifically described. The "assumed influence" of the vulnerability of the vulnerability information 810A is "possibility of execution of optional code". Therefore, the relevant threats are "unauthorized execution of process" and "malware infection", and the relevance degrees thereof are "1.0" and "0.8". In addition, since the severity of vulnerability of the vulnerability information 810A is "5.4", the "vulnerability influence degrees" regarding "unauthorized execution of process" and "malware infection" are "5.4" and "4.3". FIG. 13 shows a vulnerability influence degree calculation result in this specific example. The vulnerability influence degree calculation unit 111 transmits a vulnerability influence degree calculation result 911 to the vulnerability influence degree determination unit 112.

Next, on the basis of the vulnerability influence degree determination information 906, the vulnerability influence degree determination unit 112 determines whether or not the vulnerability level needs to be changed (step ST106), and if the vulnerability influence degree determination unit 112 determines that the vulnerability level needs to be changed, the vulnerability influence degree determination unit 112 performs change of the vulnerability level and risk evaluation for the evaluation target system (step ST107). When having received the vulnerability influence degree calculation result 911 from the vulnerability influence degree calculation unit 111, the vulnerability influence degree determination unit 112 extracts all of the "threats" and the values of the corresponding "vulnerability influence degrees" included in the vulnerability influence degree calculation result 911, and determines which of the ranges defined in the vulnerability influence degree determination information 906 the value of each vulnerability influence degree belongs to. In addition, on the basis of the range of "vulnerability influence degree" and the "relevance to vulnerability level" associated with each other in the vulnerability influence degree determination information 906, the vulnerability influence degree determination unit 112 determines whether or not the vulnerability level needs to be changed, and the amount of the change. If it is determined that the vulnerability level needs to be changed, the vulnerability influence degree determination unit 112 changes the vulnerability level by the amount of change defined in the "relevance to vulnerability level", regarding the threat for which it is determined that the vulnerability level needs to be changed. In addition, regarding the threat for which the vulnerability level is changed, the corresponding risk value is also evaluated. Evaluation for the risk value is determined on the basis of the risk value definition information 904 in accordance with a combination of the asset importance, the threat level, and the changed vulnerability level.

In the case where it is determined that change of the vulnerability level is not needed, the process proceeds to output of the evaluation result in step ST108.

Determination for the vulnerability influence degree regarding the vulnerability influence degree calculation result 911 will be described. In the vulnerability influence degree calculation result 911, the value of the vulnerability influence degree regarding the threat "unauthorized execution of process" is 5.4, and the value of the vulnerability influence degree regarding the threat "malware infection" is 4.3. Thus, both values are in the range of "4<vulnerability influence degree≤9", so that the "vulnerability level is increased by 1". Therefore, the risk evaluation information 902 is updated as in risk evaluation information 9021 shown in FIG. 14. In the risk evaluation information 9021, items where the values have been changed by update are indicated by hatching. In the updated risk evaluation information 9021, the vulnerability levels of vulnerabilities for the threat "unauthorized execution of program" and the threat "malware infection" on the equipment "operation terminal" of the system A have been each increased from "1" to "2", and along with the changes of the vulnerability levels, the risk values have been also raised from "B" to "A". The vulnerability influence degree determination unit 112 transmits the updated risk evaluation information 9021 to the evaluation result output unit 113.

Figures 15, 16:
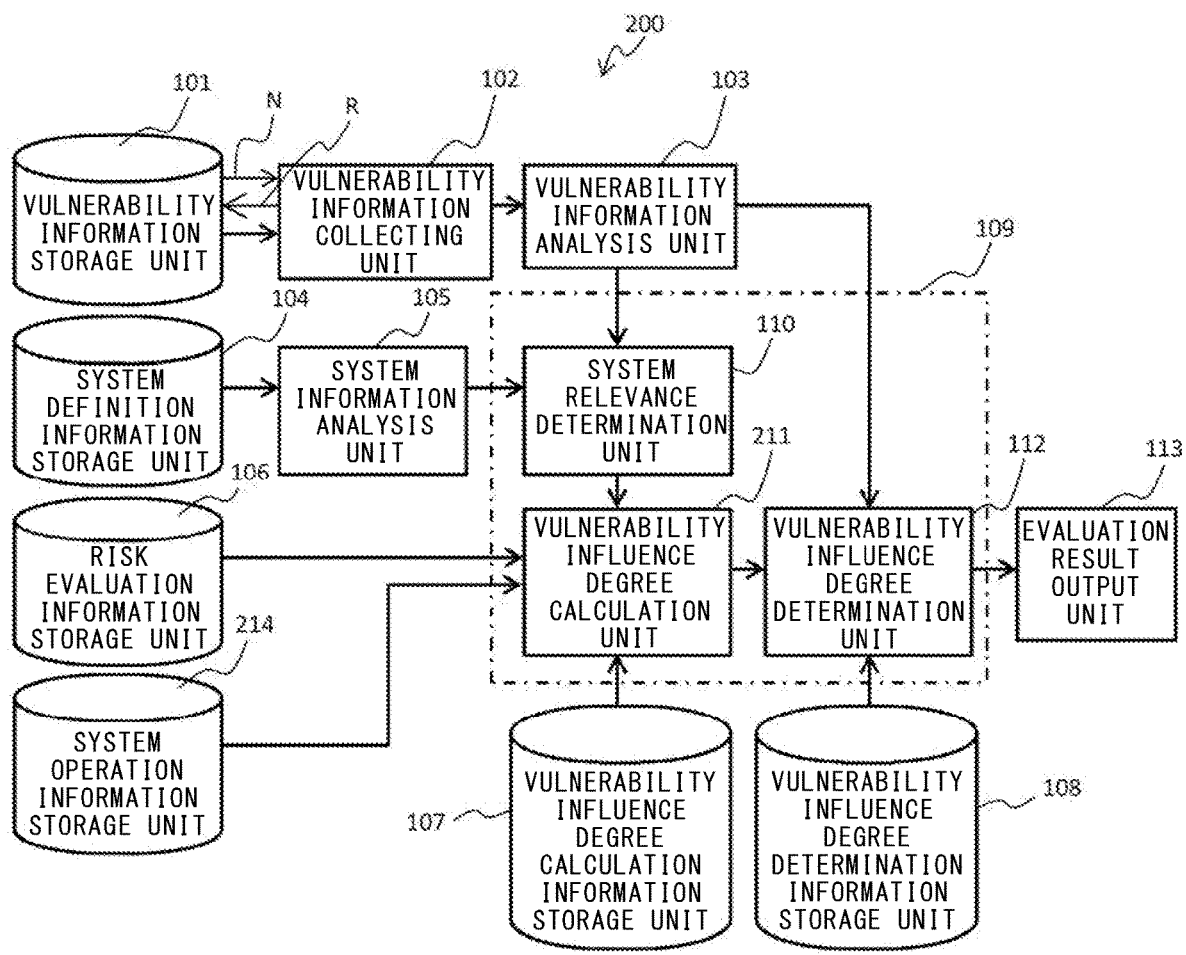
FIG. 15 is a diagram showing an example of an evaluation result according to the first embodiment.
FIG. 16 is a function block diagram showing the configuration of a vulnerability influence evaluation system according to the second embodiment.

Next, the evaluation result output unit 113 receives the risk evaluation information from the vulnerability influence degree determination unit 112, and outputs the received risk evaluation information in a predetermined format (step ST108). FIG. 15 shows an example of output of the evaluation result output unit 113. An evaluation result 912 is output of the content of the risk evaluation information 9021, and includes vulnerability information about vulnerability subjected to vulnerability influence evaluation, whether or not there is a risk in each evaluation target system, information about execution of vulnerability countermeasures, the relevant threats, and change in each risk value due to the threats, i.e., information about a result of determination by the vulnerability influence degree determination unit 112.

According to the first embodiment, it is possible to timely perform evaluation for vulnerability influence. More specifically, the vulnerability information storage unit is provided which stores vulnerability information including information indicating the vulnerability target which is a target to be influenced by vulnerability, and the vulnerability severity information about the vulnerability, and the vulnerability information collecting unit is provided which collects the latest vulnerability information from the vulnerability information storage unit. The vulnerability influence evaluation is performed on the basis of the latest vulnerability information collected by the vulnerability information collecting unit. In addition, the system relevance determination unit detects, as relevant vulnerability, vulnerability relevant to the evaluation target system from the vulnerabilities in the collected vulnerability information. Regarding the detected relevant vulnerability, the vulnerability influence degree is calculated by the vulnerability influence degree calculation unit, and on the basis of a result of calculation of the vulnerability influence degree, whether or not the vulnerability level needs to be changed is determined. Thus, regarding the vulnerability relevant to the evaluation target system, determination for the vulnerability level is performed on the basis of the latest vulnerability information, whereby evaluation for vulnerability influence can be performed timely and appropriately. In addition, manpower and time required for vulnerability influence evaluation can be reduced.

In addition, when addition or update of the vulnerability information has been performed, the vulnerability information storage unit transmits the vulnerability information update notification to the vulnerability information collecting unit, and when the vulnerability information collecting unit has received the vulnerability information update notification, the vulnerability information collecting unit collects the latest vulnerability information from the vulnerability information storage unit. Thus, it is possible to perform vulnerability influence evaluation in which the update condition of the vulnerability information in the vulnerability information storage unit is timely reflected. Therefore, application is also possible to a system such as a control system for a power plant or the like for which acquisition of vulnerability information in real time and immediate vulnerability influence evaluation are particularly required. In addition, since collection of vulnerability information is performed when the vulnerability information has been updated, it is possible to prevent occurrence of such waste that the vulnerability information that has been already collected is collected again, whereby increase in communication cost can be suppressed.

It is noted that collection of vulnerability information by the vulnerability information collecting unit is not limited to the manner in the first embodiment. For example, collection of the latest vulnerability information may be performed periodically. In this case, there is a possibility that a slight time lag occurs in reflection of the latest update condition, but the function of transmitting the vulnerability information update notification can be omitted from the vulnerability information storage unit.

In addition, collection of vulnerability information may be performed at a timing of starting vulnerability influence evaluation. In this case, there is a possibility that the vulnerability information that has been already collected is collected again. However, the function of transmitting the vulnerability information update notification can be omitted from the vulnerability information storage unit, and it is possible to perform vulnerability influence evaluation in which the update condition of the vulnerability information at the time of starting the vulnerability influence evaluation is reflected.

The type of an evaluation target system in the first embodiment is not particularly limited. By using the system definition information and the system information analysis unit that are adapted to each evaluation target system, it is possible to apply the first embodiment to various types of systems, e.g., an information system or a control system.

In the first embodiment, as the method for risk evaluation for vulnerability influence degree evaluation, a method of performing detailed risk analysis on an asset basis is used. However, the method for risk evaluation is not limited thereto. By using the vulnerability influence degree calculation unit and the vulnerability influence degree determination unit that are adapted to the method for risk evaluation, it is possible to evaluate the vulnerability influence degree regarding the evaluation target system by various risk evaluation methods.

In evaluation for the vulnerability influence degree in the first embodiment, the method based on risk evaluation is used. However, without limitation to the method based on risk evaluation, the vulnerability influence degree may be evaluated using artificial intelligence such as machine learning including deep learning.

In the first embodiment, a unit of an evaluation target in vulnerability influence evaluation is a "system". However, "equipment" or a "constituent component" may be a unit of an evaluation target.

Second Embodiment

Hereinafter, the second embodiment will be described with reference to FIG. 16. It is noted that parts that are the same as or correspond to those in FIG. 1 to FIG. 15 are denoted by the same reference characters, and the description thereof is omitted. FIG. 16 is a function block diagram showing the configuration of a vulnerability influence evaluation system according to the second embodiment. A vulnerability influence evaluation system 200 is different from the first embodiment in that a system operation information storage unit 214 for storing information about the operation condition of an evaluation target system as system operation information is provided, and a vulnerability influence degree calculation unit 211 uses the system operation information in calculation for the vulnerability influence degree. The system operation information is various logs such as an operation log of the system, an access log from a user, an authentication log, and an event log, for example. These logs are collected in real time by a log collecting unit (not shown), and are stored into the system operation information storage unit 214 at all times.

In calculation for the vulnerability information influence degree, the vulnerability influence degree calculation unit 211 acquires the system operation information about the evaluation target system from the system operation information storage unit 214, and corrects the "relevance degree" in the vulnerability influence degree calculation information 905 in accordance with the operation condition of the evaluation target system. For example, in the case where unauthorized execution of process is detected as a result of analysis of the operation log of the system, a correction process is executed to increase the relevance degree for the threat "unauthorized execution of process". The vulnerability influence degree calculation unit 211 calculates the vulnerability influence degree of the relevant vulnerability on the basis of the vulnerability influence degree calculation information 905 corrected as described above, and transmits a result of calculation of the vulnerability influence degree to the vulnerability influence degree determination unit 112.

The other matters are the same as in the first embodiment, and therefore the description thereof is omitted.

According to the second embodiment, the same effects as those in the first embodiment can be obtained.

In addition, it is possible to perform more accurate vulnerability influence evaluation in which the operation condition of the evaluation target system is reflected. More specifically, the system operation information storage unit for storing system operation information about the evaluation target system is provided, and in calculation for the vulnerability influence degree, the relevance degree between the vulnerability and the threat is corrected in accordance with the system operation condition of the evaluation target system. Thus, the system operation condition is reflected in the calculated vulnerability influence degree, so that the system operation condition is reflected also in determination of the vulnerability influence degree and update of the risk evaluation. Therefore, it is possible to perform more accurate vulnerability influence evaluation in which the operation condition of the system at the time of vulnerability influence evaluation is timely reflected.

Third Embodiment

Figure 17:
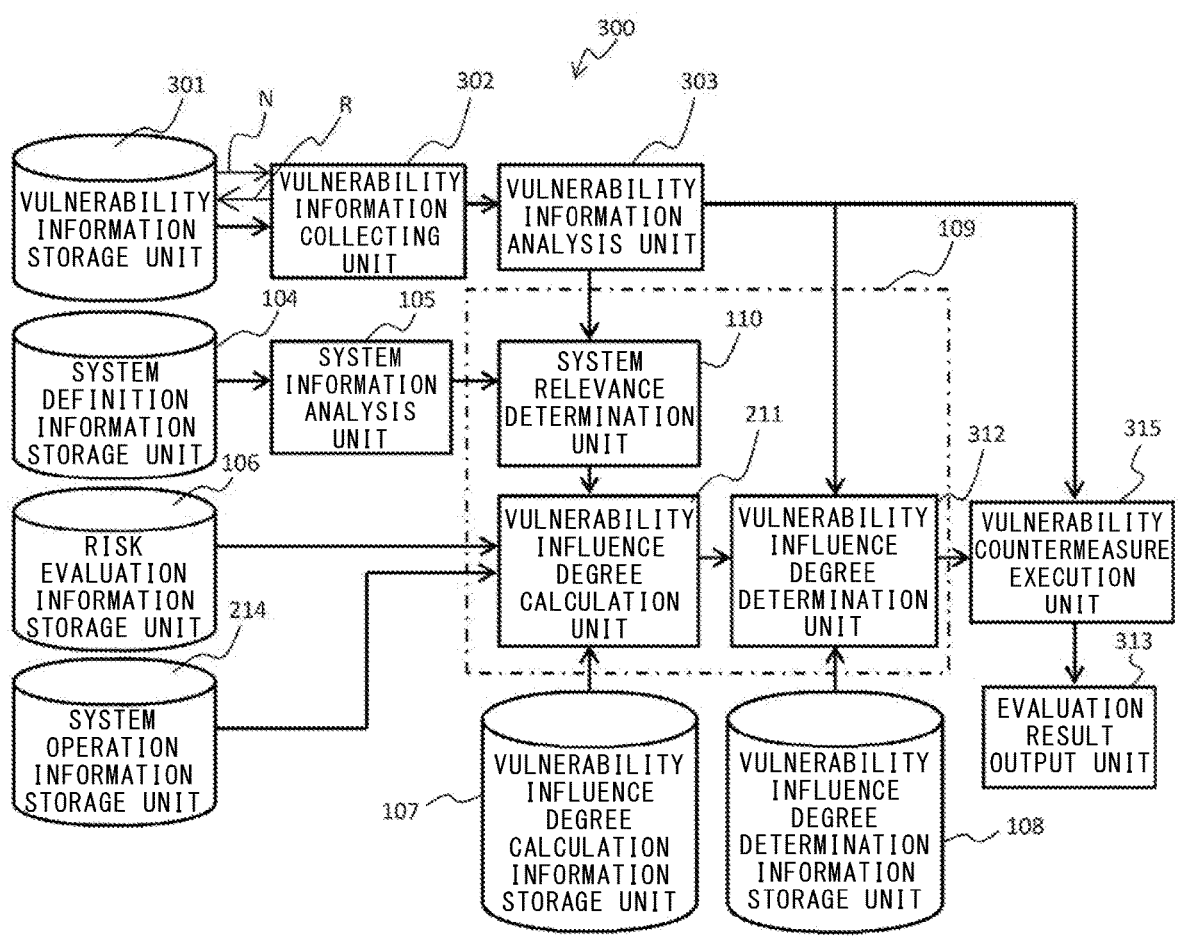
FIG. 17 is a function block diagram showing the configuration of a vulnerability influence evaluation system according to the third embodiment.

Hereinafter, the third embodiment will be described with reference to FIG. 17 to FIG. 19. It is noted that parts that are the same as or correspond to those in FIG. 1 to FIG. 16 are denoted by the same reference characters, and the description thereof is omitted. FIG. 17 is a function block diagram showing the configuration of a vulnerability influence evaluation system according to the third embodiment. A vulnerability influence evaluation system 300 is different from the second embodiment in that a vulnerability countermeasure execution unit 315 is provided which executes a countermeasure for reducing the vulnerability level of vulnerability subjected to vulnerability influence evaluation.

A vulnerability information storage unit 301 stores vulnerability information 830 including vulnerability countermeasure information as shown in an example in FIG. 18. The vulnerability information 830 includes vulnerability identification information 811, vulnerability relevant product information 812, vulnerability relevant version information 813, vulnerability influence information 814, and vulnerability severity information 815 as in the vulnerability information 810A, 810B, and also includes vulnerability countermeasure information 836. The vulnerability countermeasure information 836 is information indicating a countermeasure for reducing the vulnerability level of the vulnerability, e.g., "installation of latest version" or "application of patch". A workaround as a temporary countermeasure is also included in a specific example of the vulnerability countermeasure information 836. Here, the "latest version" is assumed to be a version of 2.3 or later. A vulnerability information collecting unit 302 collects the vulnerability information 830 including the vulnerability countermeasure information, as in the vulnerability information collecting unit 102, and transmits the collected vulnerability information to a vulnerability information analysis unit 303. When having received the vulnerability information 830, the vulnerability information analysis unit 303 transmits the analyzed vulnerability information 830 to the system relevance determination unit 110 and a vulnerability influence degree determination unit 312, as in the vulnerability information analysis unit 103, and transmits the vulnerability countermeasure information 836 to the vulnerability countermeasure execution unit 315. Since the vulnerability information 830 is the same as the vulnerability information 810A except for including the vulnerability countermeasure information 836, vulnerability of the vulnerability information 830 is determined as the relevant vulnerability of the system A by the system relevance determination unit 110. Calculation for the vulnerability influence degree is also performed in the same manner as in the case of the vulnerability information 810A, and a result of the calculation of the vulnerability influence degree is also the same as in the case of the vulnerability information 810A.

When having received a vulnerability influence degree calculation result from the vulnerability influence degree calculation unit 211 and the vulnerability information 830 from the vulnerability information analysis unit 303, the vulnerability influence degree determination unit 312 determines whether or not the vulnerability level needs to be changed, and the amount of the change of the vulnerability level, in accordance with the vulnerability influence degree determination information 906. In addition, the vulnerability influence degree determination unit 312 receives the risk evaluation information 902 from the vulnerability influence degree calculation unit 211, and after determination of the vulnerability influence degree, updates the risk evaluation information 902 in accordance with a result of the determination. The vulnerability influence degree determination unit 312 transmits the updated risk evaluation information to the vulnerability countermeasure execution unit 315.

The vulnerability countermeasure execution unit 315 receives the updated risk evaluation information from the vulnerability influence degree determination unit 312, and receives the vulnerability countermeasure information 836 from the vulnerability information analysis unit 303, and then performs a vulnerability countermeasure in accordance with "priority of countermeasure". In the case of the vulnerability information 830, the updated risk evaluation information is the same as the risk evaluation information 9021 shown in FIG. 14, and therefore, the vulnerability regarding the threat "unauthorized execution of program" and the threat "malware infection" for the equipment "operation terminal" of the system A, i.e., the vulnerability of the vulnerability information 830 and the risk values of risks regarding this vulnerability, are increased. The vulnerability countermeasure execution unit 315 determines that the vulnerability for which the risk value has been increased as described above is "high in priority of countermeasure", and performs a vulnerability countermeasure for the vulnerability of the vulnerability information 830.

The vulnerability countermeasure by the vulnerability countermeasure execution unit 315 is performed on the basis of the vulnerability countermeasure information 836. The vulnerability countermeasure for the vulnerability of the vulnerability information 830 is "installation of latest version" as indicated in the vulnerability countermeasure information 836. Therefore, the vulnerability countermeasure execution unit 315 acquires the latest version of XXX software, and installs the XXX software of the latest version onto the operation terminal of the system A. Thus, the version of the XXX software installed on the operation terminal of the system A becomes a version of 2.3 or later, so that the vulnerability of the vulnerability information 830 is eliminated. Accordingly, the vulnerability level of the vulnerability of the vulnerability information 830 and the risk value of the risk regarding the vulnerability are reduced. After execution of the vulnerability countermeasure, the vulnerability countermeasure execution unit 315 transmits the risk evaluation information in which reduction of the vulnerability level as a result of the execution of the vulnerability countermeasure is reflected, to an evaluation result output unit 313.

In the third embodiment, the vulnerability for which the relevant risk value is increased is set to be "high in priority of countermeasure". However, the method for setting "priority of countermeasure" is not limited thereto.

The evaluation result output unit 313 receives the risk evaluation information in which a result of the vulnerability countermeasure is reflected, from the vulnerability countermeasure execution unit 315, and outputs the received risk evaluation information in a predetermined format. FIG. 19 shows an example of output of the evaluation result output unit 313. An evaluation result 932 is output of the content of the risk evaluation information after execution of the vulnerability countermeasure, and includes vulnerability information about vulnerability subjected to vulnerability influence evaluation, whether or not there is a risk in each evaluation target system, information about execution of vulnerability countermeasures, the relevant threats, and change in each risk value due to the threats, i.e., information about a result of determination by the vulnerability influence degree determination unit 312.

The other matters are the same as in the second embodiment, and therefore the description thereof is omitted.

In the third embodiment, the vulnerability countermeasure execution unit 315 is added to the vulnerability influence evaluation system 200 of the second embodiment. However, the vulnerability countermeasure execution unit 315 may be added to the vulnerability influence evaluation system 100 of the first embodiment.

According to the third embodiment, the same effects as those in the second embodiment can be obtained.

In addition, it is possible to more swiftly perform a vulnerability countermeasure according to a result of vulnerability influence evaluation. More specifically, the vulnerability countermeasure execution unit is provided which performs a vulnerability countermeasure on the basis of the risk evaluation information received from the vulnerability influence degree determination unit and the vulnerability countermeasure information received from the vulnerability information analysis unit. Therefore, even if the risk value regarding a specific vulnerability is increased as a result of determination by the vulnerability influence degree determination unit, a vulnerability countermeasure indicated in the vulnerability countermeasure information for the specific vulnerability is performed by the vulnerability countermeasure execution unit at a stage before output of the result. Thus, it is possible to more swiftly perform a vulnerability countermeasure according to a result of vulnerability influence evaluation. In addition, it is possible to reduce the burden on a person for a vulnerability countermeasure.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

100, 200, 300 vulnerability influence evaluation system
101, 301 vulnerability information storage unit
102, 302 vulnerability information collecting unit
110 system relevance determination unit
111, 211 vulnerability influence degree calculation unit
112, 312 vulnerability influence degree determination unit
113, 313 evaluation result output unit
214 system operation information storage unit
315 vulnerability countermeasure execution unit
810A, 810B, 830 vulnerability information
812 vulnerability relevant product information
813 vulnerability relevant version information
815 vulnerability severity information
836 vulnerability countermeasure information
901 system definition information
902, 9021 risk evaluation information
905 vulnerability influence degree calculation information
906 vulnerability influence degree determination information
911 vulnerability influence degree calculation result
912, 932 evaluation result
N vulnerability information update notification

What is claimed is:

1. A vulnerability influence evaluation system comprising:
   a vulnerability information storage which stores vulnerability information including (i) information indicating a vulnerability target which is a target to be influenced by vulnerability, and (ii) information indicating a severity of the vulnerability in terms of security;
   a processor; and
   an output,
   wherein the processor is configured to
      collect the latest vulnerability information from the vulnerability information storage,
      compare configuration information about an evaluation target with the vulnerability information,
      determine whether there is relevance between the evaluation target and the vulnerability of each vulnerability information on the basis of whether the evaluation target includes the vulnerability target indicated by the vulnerability information stored in the vulnerability information storage,
      detect the vulnerability determined to be relevant to the evaluation target, as relevant vulnerability,
      obtain system operation information about the evaluation target, said system operation information including an operation condition of the evaluation target,
      calculate a vulnerability influence degree of the relevant vulnerability on the basis of (i) the severity of the relevant vulnerability and (ii) a relevance degree that is corrected in accordance with the operation condition of the evaluation target, wherein said relevance degree is between (a) the relevant vulnerability and (b) a threat according to the relevant vulnerability, and perform a determination as to a vulnerability level of the evaluation target on the basis of the calculated vulnerability influence degree, and wherein the output outputs a result of the determination.

2. The vulnerability influence evaluation system according to claim 1, wherein the system operation information includes various logs that are collected in real time.

3. The vulnerability influence evaluation system according to claim 2, wherein the vulnerability information further includes vulnerability countermeasure information which is information indicating a countermeasure for the vulnerability, and the processor is further configured to perform a vulnerability countermeasure on the basis of the vulnerability countermeasure information, wherein the processor performs the vulnerability countermeasure for the relevant vulnerability for which determination on the vulnerability influence degree has been performed.

4. The vulnerability influence evaluation system according to claim 2, wherein the vulnerability information storage transmits a vulnerability information update notification to the processor when an addition or update has been performed for the stored vulnerability information, and the processor collects the vulnerability information when having received the vulnerability information update notification.

5. The vulnerability influence evaluation system according to claim 2, wherein the processor collects the vulnerability information periodically.

6. The vulnerability influence evaluation system according to claim 2, wherein the processor collects the vulnerability information at a timing of starting vulnerability influence evaluation for the evaluation target.

7. The vulnerability influence evaluation system according to claim 3, wherein the vulnerability information storage transmits a vulnerability information update notification to the processor when an addition or update has been performed for the stored vulnerability information, and the processor collects the vulnerability information when having received the vulnerability information update notification.

8. The vulnerability influence evaluation system according to claim 3, wherein the processor collects the vulnerability information periodically.

9. The vulnerability influence evaluation system according to claim 3, wherein the processor collects the vulnerability information at a timing of starting vulnerability influence evaluation for the evaluation target.

10. The vulnerability influence evaluation system according to claim 1, wherein the vulnerability information further includes vulnerability countermeasure information which is information indicating a countermeasure for the vulnerability, and the processor is further configured to perform a vulnerability countermeasure on the basis of the vulnerability countermeasure information, wherein the processor performs the vulnerability countermeasure for the relevant vulnerability for which determination on the vulnerability influence degree has been performed.

11. The vulnerability influence evaluation system according to claim 10, wherein the vulnerability information storage transmits a vulnerability information update notification to the processor when an addition or update has been performed for the stored vulnerability information, and the processor collects the vulnerability information when having received the vulnerability information update notification.

12. The vulnerability influence evaluation system according to claim 10, wherein the processor collects the vulnerability information periodically.

13. The vulnerability influence evaluation system according to claim 10, wherein the processor collects the vulnerability information at a timing of starting vulnerability influence evaluation for the evaluation target.

14. The vulnerability influence evaluation system according to claim 1, wherein the vulnerability information storage transmits a vulnerability information update notification to the processor when an addition or update has been performed for the stored vulnerability information, and the processor collects the vulnerability information when having received the vulnerability information update notification.

15. The vulnerability influence evaluation system according to claim 1, wherein the processor collects the vulnerability information periodically.

16. The vulnerability influence evaluation system according to claim 1, wherein the processor collects the vulnerability information at a timing of starting vulnerability influence evaluation for the evaluation target.

* * * * *